C. MENDEL.
STABILIZING AIRCRAFT BY MEANS OF GYROSCOPIC EFFECTS.
APPLICATION FILED JAN. 27, 1921.

1,431,244.  
Patented Oct. 10, 1922.  
3 SHEETS—SHEET 1.

Inventor:  
Carlo Mendel,  
By Henry M. Sy  
Atty.

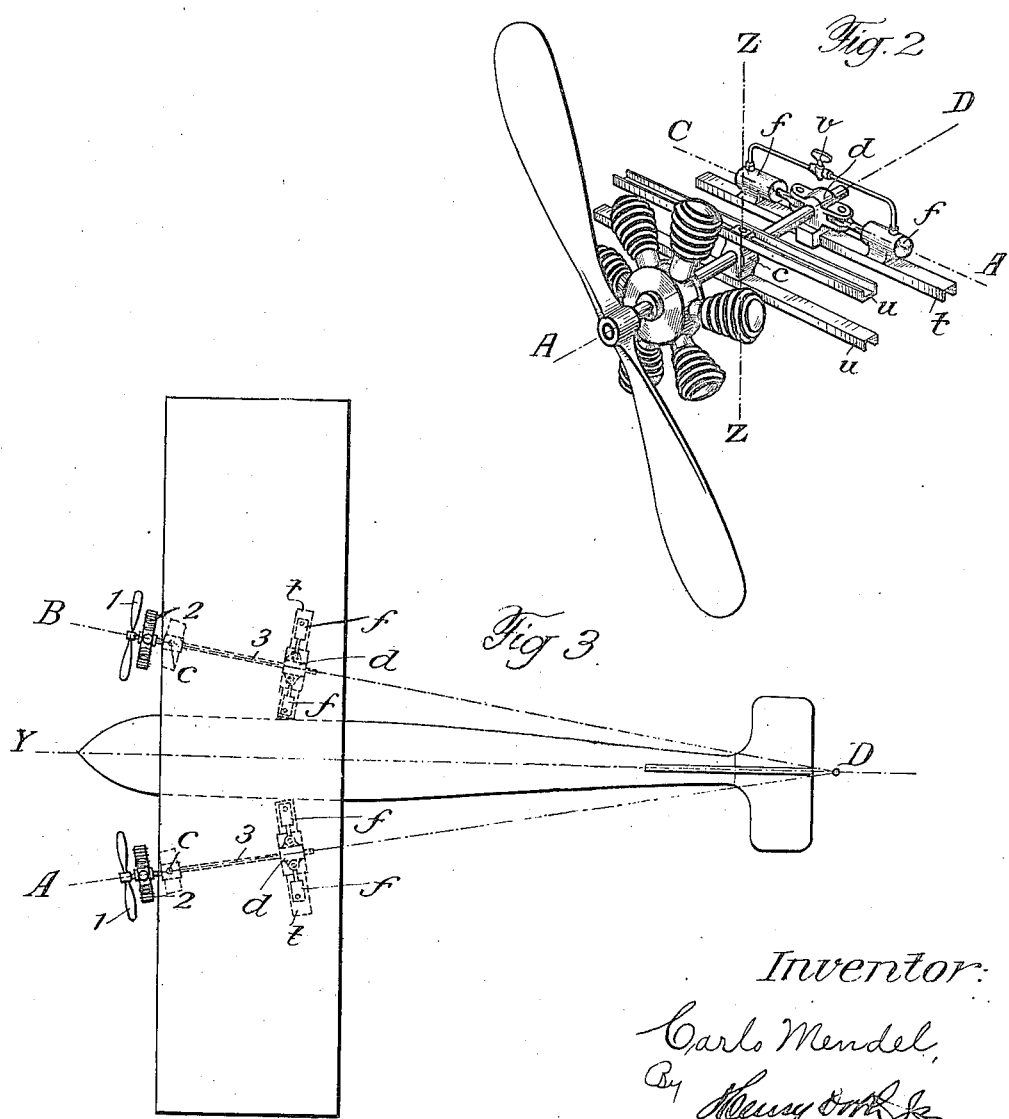

C. MENDEL.
STABILIZING AIRCRAFT BY MEANS OF GYROSCOPIC EFFECTS.
APPLICATION FILED JAN. 27, 1921.
1,431,244.
Patented Oct. 10, 1922.
3 SHEETS—SHEET 3.
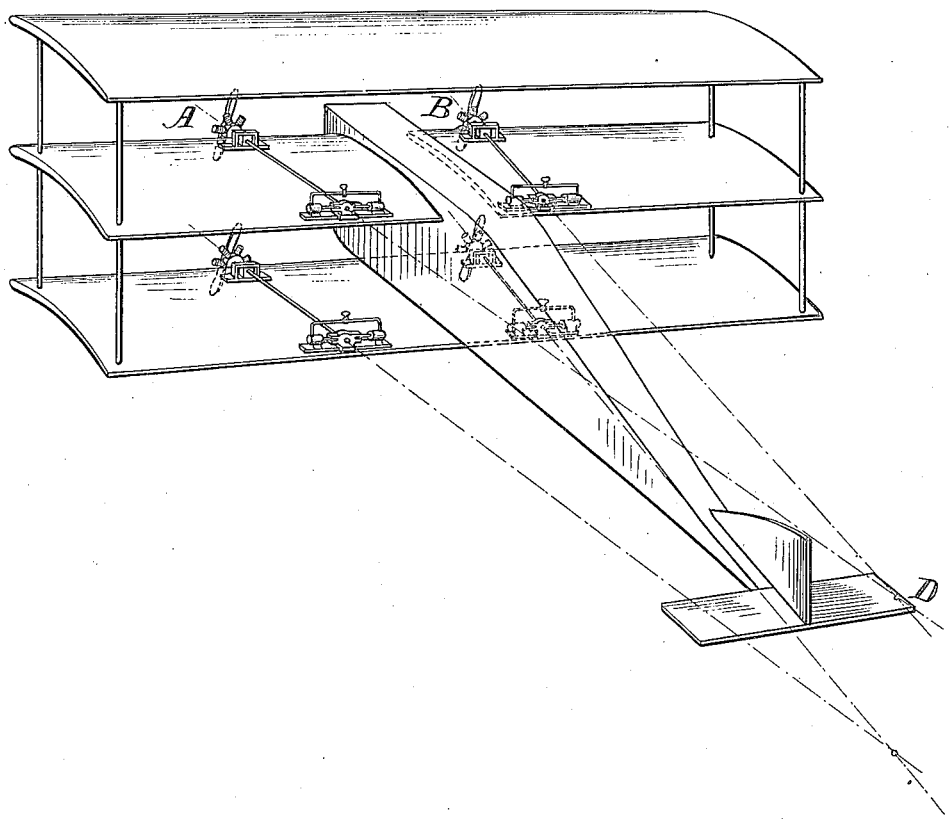
Fig. 4.
Inventor.

Patented Oct. 10, 1922.

1,431,244

UNITED STATES PATENT OFFICE.

CARLO MENDEL, OF ALEXANDRIA, EGYPT.

STABILIZING AIRCRAFT BY MEANS OF GYROSCOPIC EFFECTS.

Application filed January 27, 1921. Serial No. 440,454.

*To all whom it may concern:*

Be it known that I, CARLO MENDEL, a subject of the King of Italy, residing at Alexandria, % G. Stagni & Figli, Egypt, have invented certain new and useful Improvements in Stabilizing Aircraft by Means of Gyroscopic Effects (for which application for patent was filed in Italy, December 17, 1919, Reg. No. 285/3245); and I do hereby declare the following to be clear, full, and exact description of the invention, such as will enable others skilled in the art to which it appertains to make and use the same, reference being had to the accompanying drawing, and to letters or figures of reference marked thereon, which form a part of this specification.

This invention relates to gyroscopic means for stabilizing aeronautical machines.

With aircrafts provided with two propellers rotating in opposite directions each being adjustable in a direction at right angles to the line of flight of the aircraft, against the action of damping means, the gyroscopic action of the rotating masses influences pitching movements, i. e., oscillating movements of the aircraft about its transverse axis. With the propellers arranged with their axes at an angle to the longitudinal central plane of the air craft, the stabilizing effect, caused by the gyroscopic action of the propellers, influences only the rolling movements of the aircraft, i. e., the turning movement about its longitudinal axis.

The gyroscopic action being caused by the tendency of the rotating masses to bring their axes of rotation to coincide with the direction of the resulting forces caused by the disturbing moments, whereby the precession movements are generated, the gyroscopic impulses of the rotating masses are dependent upon the resistance of the damping means and increase continually at the expense of the disturbing moments.

According to the present invention the rotating masses of each driving group, i. e., the rotary motors and propellers, that rotate in opposite directions are arranged symmetrically to the vertical central plane of the aircraft, the axes of rotation of each pair of masses intersecting each other at a point in said plane. The axes of the rotating masses are arranged to carry out swinging movements, limited by damping devices, around axes perpendicular to a plane passing through the central axes of each pair of rotating masses, whereby the latter induce stabilizing movements acting on the aircraft.

The above described arrangements of the driving groups exert stabilizing effects upon the aircraft when the latter pitches or rolls. It presents, further, the advantage that the swinging of the axes of the rotary groups may be utilized for influencing the gear controlling the aircraft. When the damping device comprises fluid brakes, the overpressures resulting upon each swing of the axes of the rotary groups upon determined sides of the piston may be utilized for adjusting the rudders of the aircraft.

The accompanying drawings illustrate by way of example one mode of carrying the invention into effect.

Fig. 2 is a perspective view showing the manner of fixing the shaft of a rotary motor to an air-craft;

Fig. 3 is a plan view of an aeroplane, one pair of rotary motors and propellers of which are arranged in accordance with the invention.

Fig. 4 illustrates in a perspective view the arrangement of two pairs of rotary motors and propellers on an aeroplane according to the invention.

Figure 1:
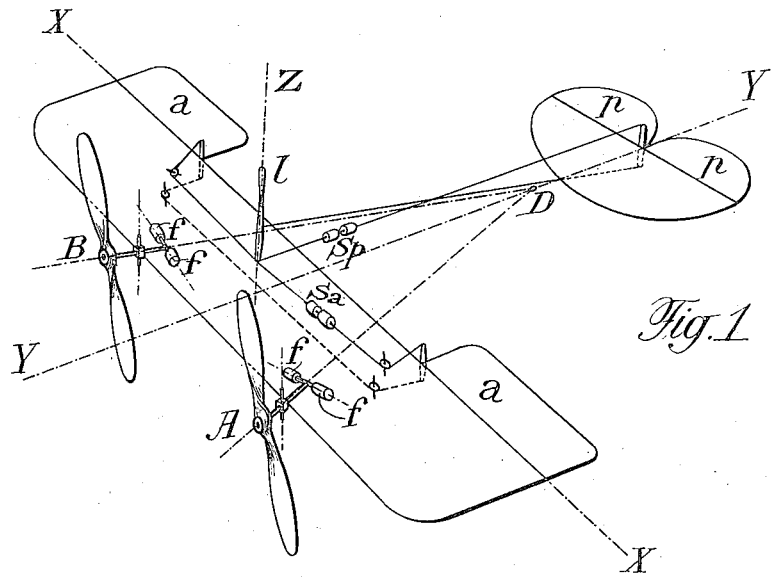
Figure 1 illustrates an aeroplane in perspective view having a pair of driving groups, of which only the propeller is shown, arranged according to this invention, and further showing the manner of controlling the ailerons by the gyroscopic action of said groups.

With the constructional example illustrated in Figure 1, in which the gyroscopic effect of the driving groups is used for influencing the controlling ailerons, *a* denotes the planes for effecting the lateral steering and *p* is the elevation rudder of the aeroplane. This controlling gear may be adjusted by hand in the usual manner by means of a hand lever 1 and the wires shown. The groups A and B rotate in opposite directions and are symmetrically arranged to the vertical central plane of the aircraft, i. e., to the axis Y, Y, the axes of the shafts of the groups when the latter are in the middle position of their precession movement intersect each other in a point D. $f$ denotes cylinders filled with liquid for damping the precession movement of the groups. Servo-motors S$a$ and S$p$ are interposed in the wires leading to the controlling ailerons.

A suitable manner of fixing the rotary motors and propellers to the air-craft is illustrated in Fig. 2 for one motor and propeller. 1 denotes the propeller, 2 the rotary motor and 3 the motor axle. The bearing $c$ for supporting the axle of the rotary motor is fitted between the cross-bars $u$, $u$ and is adapted to oscillate around the axle Z Z. The bearing $d$ of the axle of the motor is adapted to slide along the guide $t$, the bearing bushes being spherically seated in the bearing casing, and its movement is damped by the resistance of the hydraulic dash-pot cylinders $f, f$. In order to regulate the damping effect of the cylinder $f, f$ a valve $v$ is inserted into the pipe, which connects the two cylinders, by means of which valve the passage of the liquid displaced by the pistons of the cylinders $f, f$ can be throttled.

Fig. 3 illustrates the arrangement of one pair of rotary motors and propellers on an aeroplane. The propellers 1 and rotary motors 2 are carried by the motor axles 3, the front bearings $c$ of which is adapted to oscillate around vertical axes, the other bearing $d$ being adapted to slide laterally along guides. The directions of the axles 3 of the two sets intersect each other in the point D on the trajectory Y—D. If sufficient flywheel effect is given to the propellers they may solely be used for producing the gyroscopic effects.

Fig. 4 shows a perspective view of an arrangement of two pairs of rotary motors and propellers to an aeroplane, wherein the axes of every pair intersect each other on the trajectory A—D.

Figure 5:
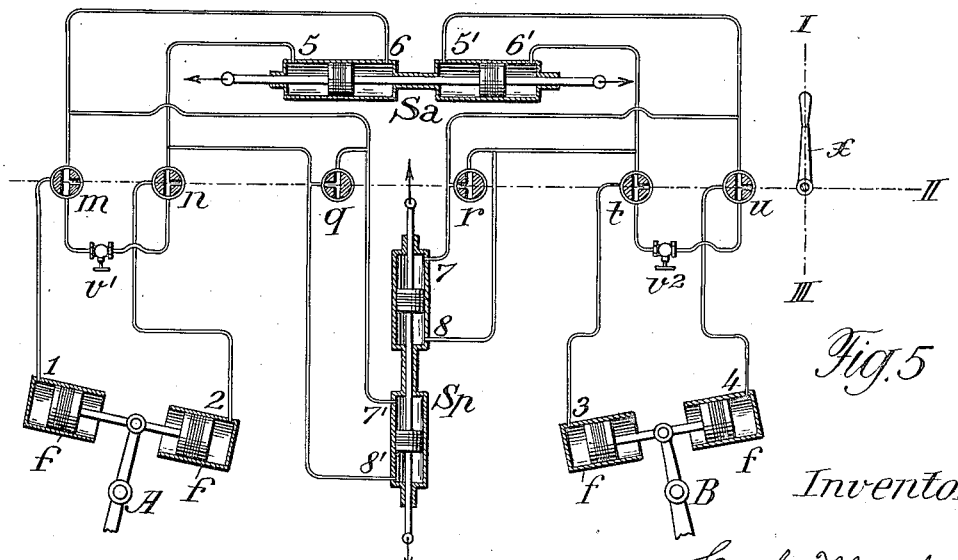
Fig. 5 shows a diagram of the pipe connections and cylinders for utilizing the precession of the driving groups for controlling the ailerons.

The servo-motors S$a$ and S$p$ are shown in detail in Fig. 5. Each servo-motor consists of two co-axial cylinders arranged one behind the other and each being provided with a double-acting piston secured to a piston rod common to both. To the end of the piston rod projecting beyond the cylinders the ends of the wires for actuating the ailerons are fixed. $f\ f$ denote the two hydraulic dash-pot cylinders of the groups A and B; $v^1$ and $v^2$ denote throttle valves, and $m, n, q, r, t, u$, are sections through the plug of a distributing valve, the sections being arranged one above the other, but are drawn beside each other for the sake of clearness. The various conduits leading from the different cylinders to the distribution valve are shown in thick lines. $x$ denotes the handle for turning the plug of the distributing valve into three different positions, I, II, III.

The manner of operation of the arrangement shown with the distributing valve in the three positions is as follows:

In Fig. 5 the plug of the distributing valve is assumed to be in the position I and the flow of liquid through the conduits 1, 2, 3, 4, connecting the two cylinders $f$ of each group with each other is interrupted. The liquid inside said cylinders cannot escape or circulate and the groups A and B are prevented from carrying out precession movements, the stabilizing effects owing to the gyroscopic action of said groups cannot occur. The section $q$ of the plug establishes connections between conduits 5 and 6 and between 7' and 8' and in a similar manner the section $r$ provides for the connections 5' with 6' and 7 with 8. The liquid contained in the cylinders of the servo-motors S$a$ and S$p$ can therefore pass from one side of the pistons to the other, and it will thus be seen that in the position I of the handle $x$ an influencing of the controlling ailerons by the gyroscopic action cannot occur and a steering by hand is rendered possible.

If now the handle $x$ is turned through an angle of 90° into the position II, a connection between the conduits 1 and 2 via the throttle valve $v^1$ and between the conduits 3 and 4 via the throttle valve $v^2$ is established. The groups can, therefore, carry out their precession movements and exert stabilizing effects on the aircraft, which effects can be varied by an adjustment of the throttle valves $v^1$ and $v^2$. The bores in the sections $q$ and $r$ establish the same connections of the conduits, i. e., 5 with 6, 7' with 8', 5' with 6' and 7 with 8, as in the above-described position I, and a steering of the aircraft by hand may be effected.

Upon a further turning of the handle $x$ through an angle of 90° from the position II to the position III, the following connections are esablished: from 1 via $m, n\ v^1$ to 2, and from 3 via $t, v^2, u$ to 4. In the position III the bores of the sections $q$ and $r$ have interrupted the direct connections 5 with 6, 7' with 8', 5' with 6' and 7 with 8, and via $m, n, t$ and $u$ the following direct connections are provided: 1 with 6 and 7'; 2 with 5 and 8', 3 with 6' and 8, and 4 with 5' and 7. The over-pressure generated in the cylinders $f$ upon each stabilizing movement of the groups on the side of the piston, which is in front when seen in the direction of the movement, acts upon the corresponding sides of the pistons of the servo-motors, displaces said pistons and influences in this manner the controlling ailerons.

Let it now be assumed that the aircraft tilts around its longitudinal axis, its left wing moving in a downward direction. In consequence thereof both groups carry out a precession movement in a clockwise direction and an overpressure is generated in the right hand cylinders $f$ of each group. These overpressures are transmitted, when the handle $x$ is in the position III, to 5 and 5' in the servo-motor $Sa$ and to 8' and 7 in the servo-motor $Sp$. In the servo-motor $Sa$ the overpressure acts on the same side of the pistons, and the pistons are displaced toward the right hand side, thus causing the planes $a$ to be adjusted. In the servo-motor $Sp$ the overpressure acts on opposite sides of the pistons and balances them and the servo-motor $Sp$ is not active.

If the aircraft tilts fore and aft, the groups carry out precession movements that are in opposite directions to each other, and in this case the servo-motor $Sp$ will become active.

As in the position III of the plug of the distributing valve a connection between the opposite sides of the cylinders of the servo-motors $Sa$ and $Sp$ via the throttle valves $v^1$ and $v^2$ respectively, exists, the pistons of the servo-motors, and therefore the controlling ailerons, may also be actuated by hand.

Locking devices for the plug or its handle respectively may be provided, which secure the latter in the positions II and III against the action of a spring that tends to turn the handle into the position I. Means may be provided on the steering lever $l$ causing said locking devices to become inoperative as soon as said means are gripped simultaneously with the hand lever, so that the plug of the distributing valve is automatically moved into the position I for steering by hand.

The overpressure generated in the cylinders $f$ when the handle $x$ is in the position II, which is to be considered as an intermediate position, forms the base for calculating the cross-sections of the servo-motor cylinders which must be sufficient to overcome the resistance on the wires when actuating the controlling ailerons.

I claim:

1. In an air-craft, the combination of pairs of rotary motors and propellers, motor shafts supporting said rotary motors and propellers and arranged such that the axes of each pair of shafts intersect each other in the trajectory of the air-craft, means secured to said air-craft for supporting each motor shaft, and turnably mounted around a vertical axis, means for supporting said shaft and adapted to slide along guiding means rigidly fixed to said air-craft, whereby said rotating motors and propellers induce gyroscopic impulses adapted to compensate any tilting moments acting on the air-craft and re-establish the equilibrium of the latter.

2. In an air-craft, the combination of one pair of rotary motors and propellers rotating in opposite directions, motor shafts supporting said rotary motors and propellers and arranged such that their axes intersect each other in a point of the trajectory of said air-craft, means secured to said air-craft for supporting each motor shaft, and turnably mounted around a vertical axis, means for supporting each shaft and adapted to slide along guiding means rigidly fixed to said air-craft, whereby said rotating motors and propellers induce gyroscopic impulses adapted to compensate any tilting moments acting on the air-craft and re-establish the equilibrium of the latter.

3. In an air-craft, the combination of a pair of rotary motors and propellers rotating in opposite directions, motor shafts supporting said rotary motors and propellers and arranged such that their axes intersect in a point of trajectory of said air-craft, means secured to said air-craft for supporting each motor shaft, and turnably mounted around a vertical axis, means for supporting each shaft and adapted to slide along guiding means rigidly fixed to said air-craft, means adapted to damp the sliding movement along said guiding means, whereby said rotating motors and propellers induce gyroscopic impulses adapted to compensate any tilting moments acting on the air-craft and re-establish the equilibrium of the latter.

4. In an air-craft, the combination of a pair of rotary motors and propellers rotating in opposite directions, motor shafts supporting said motors and propellers and arranged such that their axes intersect in a point of the trajectory of said air-craft, bearings secured to said air-craft for supporting each motor shaft, and turnably mounted around a vertical axis, bearings for supporting each shaft and adapted to slide along guiding means rigidly fixed to said air-craft, dash-pot cylinders the pistons of which are operatively connected to the sliding bearing and adapted to damp the sliding movements of the latter along said guiding means, whereby said rotating motors and propellers induce gyroscopic impulses adapted to compensate any tilting moments acting on the air-craft and re-establish the equilibrium of the latter.

5. In an air-craft, the combination of a pair of rotary motors and propellers rotating in opposite directions, motor shafts supporting said motors and propellers and arranged such that their axes intersect in a point of the trajectory of said air-craft, means secured to said air-craft for supporting each motor shaft, and turnably mounted around a vertical axis, means for supporting each shaft and adapted to slide along guiding means rigidly fixed to said air-craft, means adapted to damp the sliding movements along said guiding means, means for transmitting said sliding movement to the controlling apparatus of the air-craft in order to increase said damping action, whereby said rotating motors and propellers induce gyroscopic impulses adapted to compensate any tilting moments acting on the air-craft and re-establish the equilibrium of the latter.

6. In a air-craft, the combination of rotary masses, shafts supporting said rotary masses and symmetrically arranged in pairs to the vertical center plane of the air-craft such that the axes of each pair of shafts intersect in a point of said plane, means secured to said air-craft for supporting each shaft each of said means turnably mounted around an axis perpendicular to a plane passing through the center lines of each pair of shafts, and means for supporting each shaft arranged to slide along guiding means in said plane and rigidly fixed to said air-craft.

In testimony that I claim the foregoing as my invention, I have signed my name.

CARLO MENDEL.